US012631172B2

(12) United States Patent
Ng

(10) Patent No.: US 12,631,172 B2
(45) Date of Patent: May 19, 2026

(54) AIR-PULSE GENERATING DEVICE WITH SELF-DEMODULATION AND AIRFLOW GENERATING METHOD THEREOF

(71) Applicant: xMEMS Labs, Inc., Santa Clara, CA (US)

(72) Inventor: Eldwin Jiaqiang Ng, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/318,404

(22) Filed: Sep. 4, 2025

(65) Prior Publication Data

US 2026/0063118 A1 Mar. 5, 2026

Related U.S. Application Data

(60) Provisional application No. 63/691,202, filed on Sep. 5, 2024.

(51) Int. Cl.
*F04B 45/047* (2006.01)
*H04R 17/10* (2006.01)

(52) U.S. Cl.
CPC ............ *F04B 45/047* (2013.01); *H04R 17/10* (2013.01)

(58) Field of Classification Search
CPC .... F04B 45/047; F04B 43/043; F04B 43/046; F04B 45/043; F04B 45/04; H04R 17/10; F16K 11/10
USPC ........................................................ 417/413.2
See application file for complete search history.

(56) References Cited

U.S. PATENT DOCUMENTS

| | | | | | |
|---|---|---|---|---|---|
| 5,970,998 | A * | 10/1999 | Talbot | F16K 99/0044 251/129.02 |
| 11,043,197 | B1 * | 6/2021 | Liang | G10K 9/12 |
| 2020/0211521 | A1 * | 7/2020 | Voss | H04R 7/04 |
| 2020/0213770 | A1 * | 7/2020 | Duan | H04R 17/02 |
| 2022/0014838 | A1 * | 1/2022 | Liang | H04R 1/1066 |
| 2022/0224999 | A1 * | 7/2022 | Liang | H04R 7/04 |
| 2022/0225031 | A1 * | 7/2022 | Liang | G10K 15/04 |
| 2022/0315412 | A1 * | 10/2022 | Liang | B81B 3/0072 |
| 2023/0388695 | A1 * | 11/2023 | Lo | H04R 19/005 |

* cited by examiner

*Primary Examiner* — Mark A Laurenzi
*Assistant Examiner* — Benjamin Doyle
(74) *Attorney, Agent, or Firm* — Winston Hsu

(57) ABSTRACT

An air-pulse generating device and an airflow generating method are disclosed. An air-pulse generating device includes a flap pair, including a first flap and a second flap opposite to each other. The first flap and the second flap oscillate at an oscillation frequency and oscillate in an out-of-phase fashion with each other; wherein during an oscillation of the flap pair, the flap pair forms a virtual valve or an opening at an opening rate corresponding to the oscillation frequency.

19 Claims, 3 Drawing Sheets

AIR-PULSE GENERATING DEVICE WITH SELF-DEMODULATION AND AIRFLOW GENERATING METHOD THEREOF

CROSS REFERENCE TO RELATED APPLICATIONS

This application claims the benefit of U.S. Provisional Application No. 63/691,202, filed on Sep. 5, 2024. The content of the application is incorporated herein by reference.

BACKGROUND OF THE INVENTION

1. Field of the Invention

The present application relates to an air-pulse generating device and an airflow generating method thereof, and more particularly, to an air-pulse generating device capable of self-demodulation and an airflow generating method thereof.

2. Description of the Prior Art

Unless otherwise indicated herein, the approaches described in this section are not prior art to the claims in this application and are not admitted as prior art by inclusion in this section.

Air-pulse generating device disclosed in U.S. Pat. No. 11,943,585 operates based on an ultrasonic modulation (by common mode signal SM) and demodulation (by differential mode signal SV) scheme which is capable of producing airflow according to an input signal.

When the input signal represents audible sound, the airflow generated will correspond to the audible sound and the device may serve as an electrical to acoustic/sound transducer. When the input signal is a DC (DC: direct current) voltage level, the airflow generated will be a DC airflow and the device may serve as a micro fan for air moving purposes such as active cooling etc.

Note that, utilizing two types of signals to drive air-pulse generating device requires more complexity.

Therefore, how to reduce complexity for air-pulse generating device is a significant objective in the field.

SUMMARY OF THE INVENTION

It is therefore a primary objective of the present application to provide an air-pulse generating device capable of self-demodulation and an airflow generating method thereof, to improve over disadvantages of the prior art.

An embodiment of the present application provides an air-pulse generating device, comprising a flap pair, comprising a first flap and a second flap opposite to each other; wherein the first flap and the second flap oscillate at an oscillation frequency and oscillate in an out-of-phase fashion with each other; wherein during an oscillation of the flap pair, the flap pair forms a virtual valve or an opening at an opening rate corresponding to the oscillation frequency.

An embodiment of the present application provides an airflow generating method, applied on an air-pulse generating device, wherein the airflow generating method comprising actuating a first flap and a second flap to oscillate at an oscillation frequency and oscillate in an out-of-phase fashion with each other; wherein the air-pulse generating device comprises the first flap and the second flap opposite to each other.

These and other objectives of the present invention will no doubt become obvious to those of ordinary skill in the art after reading the following detailed description of the preferred embodiment that is illustrated in the various figures and drawings.

DETAILED DESCRIPTION

Content of U.S. Pat. Nos. 11,943,585, 12,356,141, and application Ser. No. 19/315,870 is incorporated herein by reference.

Air-pulse generating device disclosed in U.S. Pat. No. 11,943,585 may be driven by two signals, modulation signal SM and demodulation signal SV, where the modulation signal SM may be a generalized double sideband suppressed carrier (DSB-SC) signal.

Note that, in the case of sound transducer/producing applications of the air-pulse generating device (e.g., playing music), the modulation signal SM for sound of $f_{Sound}$, will be $k \cdot f_{Pulse} \pm f_{Sound}$, where $f_{Pulse}$ represents ultrasonic pulse rate of the air-pulse generating device and $f_{Sound}$ represents frequency of audio sound. Audio signal frequency may range from 16 Hz to 20 kHz or even 40 kHz in Hi-Res audio. It means that the modulation signal SM for sound transducer applications will contain no frequency component at frequency $f_{Pulse}$ or multiples of frequency $f_{Pulse}$. On the other hand, in the case of air moving applications, the input signal for generating modulation signal SM may be a DC (DC: direct current) voltage level, which means $f_{Sound}=0$, and the modulation signal SM will be at purely $k \cdot f_{Pulse}$.

Hence, while the modulation signal SM for sound transducer applications may not contain the required spectral composition for demodulation, the modulation signal SM for air moving applications does. In other words, it is feasible, mathematically, in air moving applications, to generate airflow by combining a modulation signal SM with a device capable of self-demodulation, without involving explicit demodulation signal SV.

Figure 1:
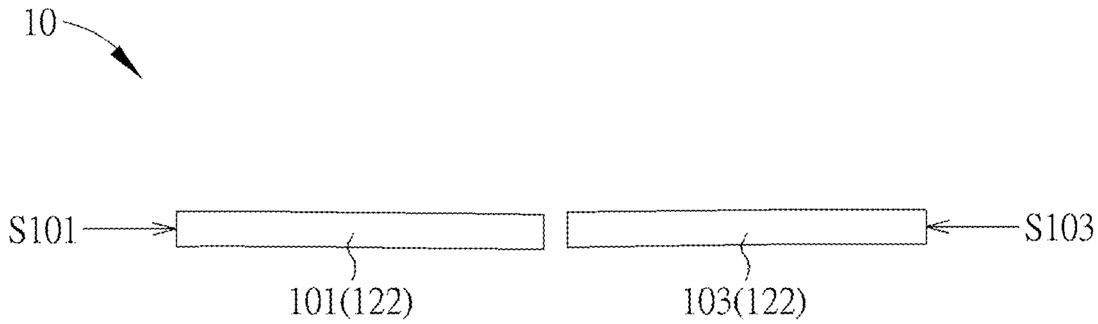
FIG. 1 is a schematic diagram of an air-pulse generating device according to an embodiment of the present invention.

FIG. 1 is a schematic diagram of an air-pulse generating device 10 according to an embodiment of the present invention. The air-pulse generating device 10 comprises a flap pair 122. The flap pair 122 comprises a first flap (101) and a second flap (103) opposite to each other. The first flap and the second flap perform an oscillation at an ultrasonic oscillation frequency $f_{osc}$. During the oscillation of the flap pair 122, the flap pair 122 forms a virtual valve VV (or an opening) at an opening rate $f_{open}$ corresponding to the oscillation frequency $f_{osc}$.

The air-pulse generating device 10 may achieve self-demodulation by comprising two opposing flaps operating/ oscillating out-of-phase (or in an out-of-phase fashion) with each other resulting in a differential displacement component.

Unlike the air-pulse generating device disclosed in U.S. Pat. No. 11,943,585, where the flap is driven by a modulation signal SM and a demodulation signal SV, the air-pulse generating device 10 may generate airflow simply by modulation signal (analogous to SM) without needing explicit demodulation signal (SV). The air-pulse generating device capable of producing a plurality unipolar air pulses without needing demodulation signal may be regarded as a device capable of self-demodulation.

Figure 2:
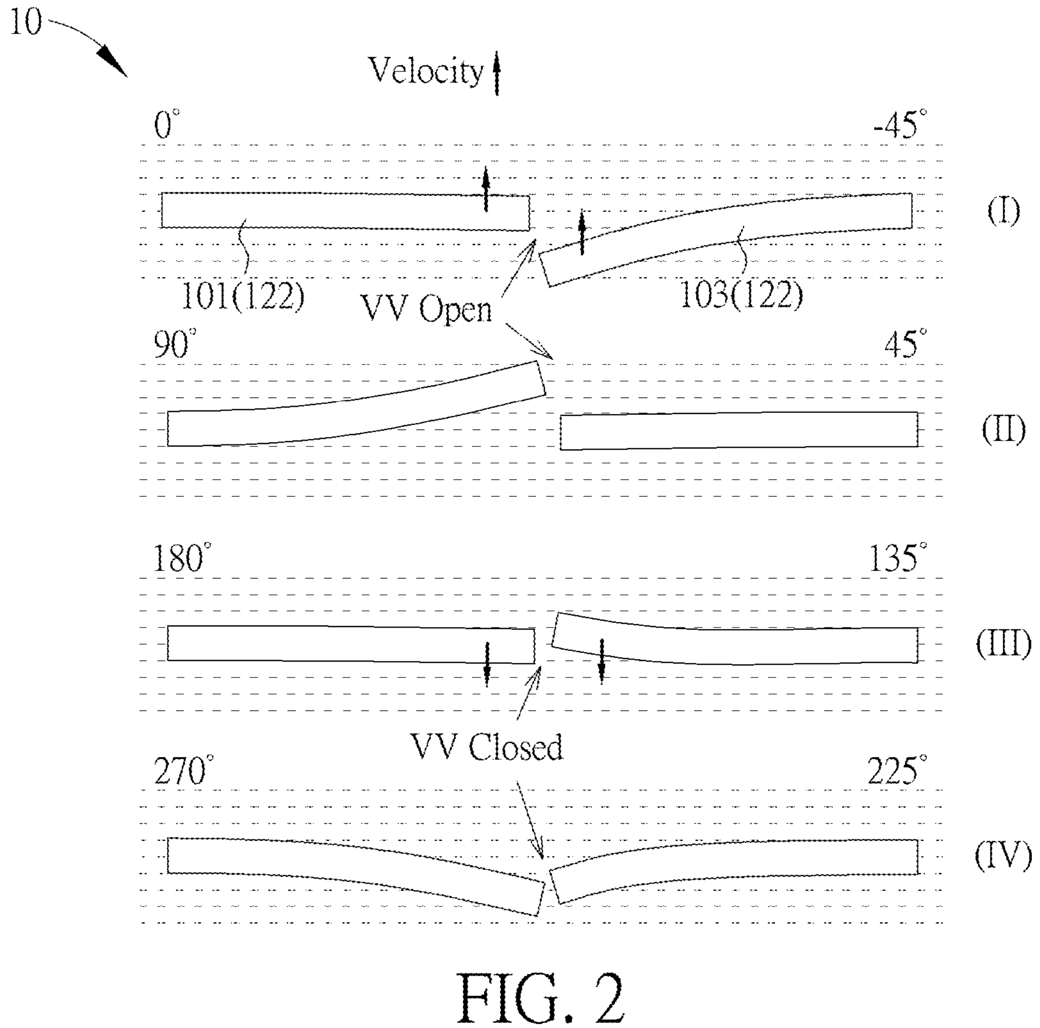
FIG. 2 is a schematic diagram of the movement of flaps in terms of the air-pulse generating device shown in FIG. 1.

Two oscillating flaps 101 and 103 moving at the same frequency with a phase difference between the movement of the flaps 101 and 103 (as shown in FIG. 2) can be viewed as having a common mode component/displacement as well as a differential mode component/displacement. For example, the movement of the flaps 101 and 103 may have a (substantially) 45° phase offset between them. The common mode displacement causes an air pressure to be generated at the flaps (see FIG. 3(*b*)), while the differential displacement results in (a degree of) the opening of the virtual valve VV (see FIG. 3(*c*)). Due to the doubling of the virtual valve opening per cycle, the demodulating carrier signal (or the opening rate $f_{open}$) may be twice the oscillation frequency $f_{osc}$.

Note that, the 45° phase offset shown in FIG. 2 serves for illustration purposes, but not limitation. As long as the flap pair 122 performs the oscillation at oscillation frequency and form virtual valve or opening at opening rate corresponding to the oscillation frequency, requirement of the present invention is satisfied, which is within the scope of the present invention.

Figure 3:
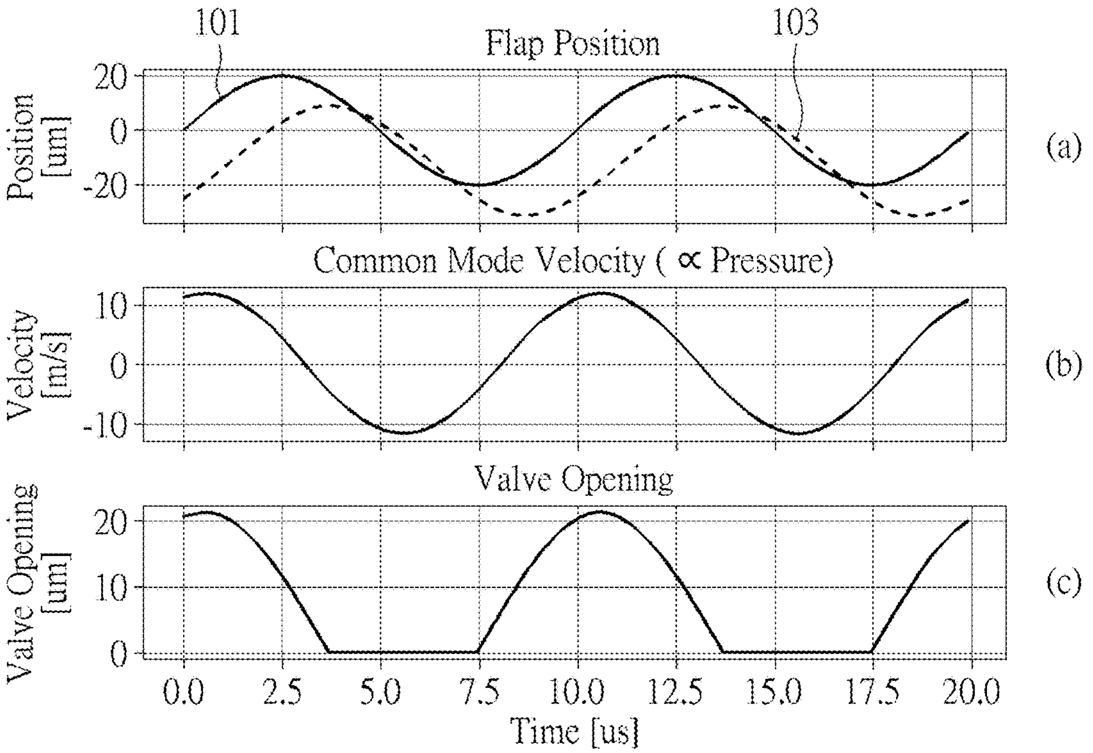
FIG. 3 is a schematic diagram of a timing of flaps movement, common mode velocity, and a degree of opening of the air-pulse generating device shown in FIG. 1.

When one of the flaps 101 and 103 has an initial displacement offset as shown in FIG. 2 and FIG. 3, there will be a frequency component at the oscillation frequency for the virtual valve opening. This produces the carrier frequency in the virtual valve opening for demodulation of the pressure wave to a DC (DC: direct current) airflow. In this regard, the air-pulse generating device of the present invention (e.g., 10) is suitable for air moving applications and can be regarded as an airflow generating device.

Figure 6:
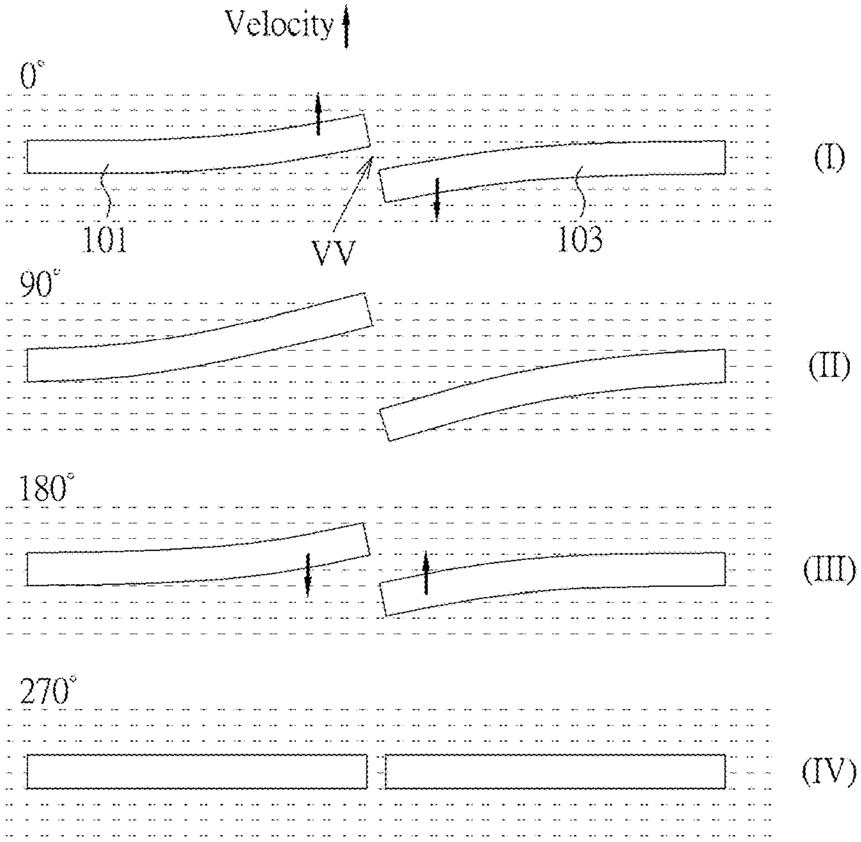
FIG. 6 is a schematic diagram of the movement of flaps in terms of the air-pulse generating device shown in FIG. 1.

In another perspective (time instant), the opposing/opposite flaps 101 and 103 start with a substantial difference in their initial, DC, or average deflection, such as larger than the thickness of the flap, such that the virtual valve VV may be considered to be partially open (see FIG. 6, phase I or III). The flaps may be actuated with differential signals, such that at some part of an oscillation cycle the flaps 101 and 103 move away from each other to open the virtual valve VV (see FIG. 6, from phase I to phase III), while at another part of the oscillation cycle the flaps 101 and 103 move towards each other to close the virtual valve VV (see FIG. 6, from phase III to phase IV).

In an embodiment, the flaps may be actuated via piezoelectric actuation, as taught in No. 11,943,585 or application Ser. No. 19/315,870, which is not narrated herein for brevity.

In an embodiment, the phase of the generated air pressure in an open field condition may be different from (or offset) the phase of the displacement by (substantially) 90°, and coincides with the opening of the virtual valve VV. FIG. 3 shows the time alignment of the common mode positive velocity (that may be largely indicative of air pressure) and the virtual valve VV opening, which results in an air pulse through the virtual valve VV in the one direction, while the negative velocity may be suppressed by aligning to the closed valve.

In other words, a common mode velocity of the flap pair 122 toward a first polarity (e.g., positive) coincide with a first period of the virtual valve VV being opened, and the common mode velocity of the flap pair 122 toward a second polarity (e.g., negative) coincide with a second period of the virtual valve VV being closed.

In a perspective, a common mode displacement of the flap pair 122 may be considered as $(D_{101}+D_{103})/2$, and a differential mode displacement of the flap pair 122 (or a degree of virtual valve opening) may be considered as $|D_{101}-D_{103}|/2$, where $D_{101}/D_{103}$ represents displacement of tip of flap 101/103.

Hence, via the self-demodulation (without the need of demodulation signal SV), the air-pulse generating device 10 is able to produce a plurality of unipolar air pulses at an ultrasonic pulse rate, and thus produce an airflow toward a (specific) direction. The air-pulse generating device 10 is suitable for air moving applications such as active air cooling, ventilation, etc., which may be referred to U.S. Pat. No. 12,356,141 and application Ser. No. 18/988,923.

Other external conditions may affect the pressure phase. If a (narrow) chamber is placed above the flaps, the compression effect of the chamber may affect the pressure phase. Alternatively, the use of a resonant chamber (e.g., the resonant chamber disclosed in U.S. application Ser. No. 18/931,055) may also affect the pressure phase. In such situations, the combined use of an initial deflection on both flaps may help to achieve the optimal phase for demodulation.

In other words, as can be seen from FIG. 3, the flap pair 122 forms the virtual valve VV "opened" when the flap pair 122 move towards a first direction (e.g., a positive direction), and the flap pair 122 forms the virtual valve VV closed when the flap pair 122 move towards a second direction opposite to the first direction (e.g., a negative direction).

As can be seen from FIG. 2 or FIG. 3(*a*), a first movement of the first flap 101 may have a phase difference with respect to a second movement of the second flap 103. In an embodiment, the phase difference may substantially be 45° or substantially be a multiple of 45° (e.g., 135°, 225°, or −45°).

To achieve the phase difference between the movement of the flaps, the flaps may be driven separately with phase shifted signals, while the initial deflection offset between the flaps may also be realized by applying a bias voltage, or designing the geometry of stressed layers on the flaps.

In other words, referring back to FIG. 1, the first flap 101 may be driven by a first signal S101, and the second flap 103 may be driven by a second signal S103. The signal S101/S103 may be viewed as modulation signal SM given input signal $S_{IN}$ is constant or be viewed as oscillating signals corresponding to oscillation frequency $f_{osc}$.

In an embodiment, the first signal S101 may have a phase shift with respect to the second signal S103. Furthermore, to achieve asymmetric initial deflection for flaps 101 and 103, the signals S101 and S103 may have different bias voltage, which means a first bias voltage of the first signal S101 may be different from a second bias voltage of the second signal 103.

Figure 4:
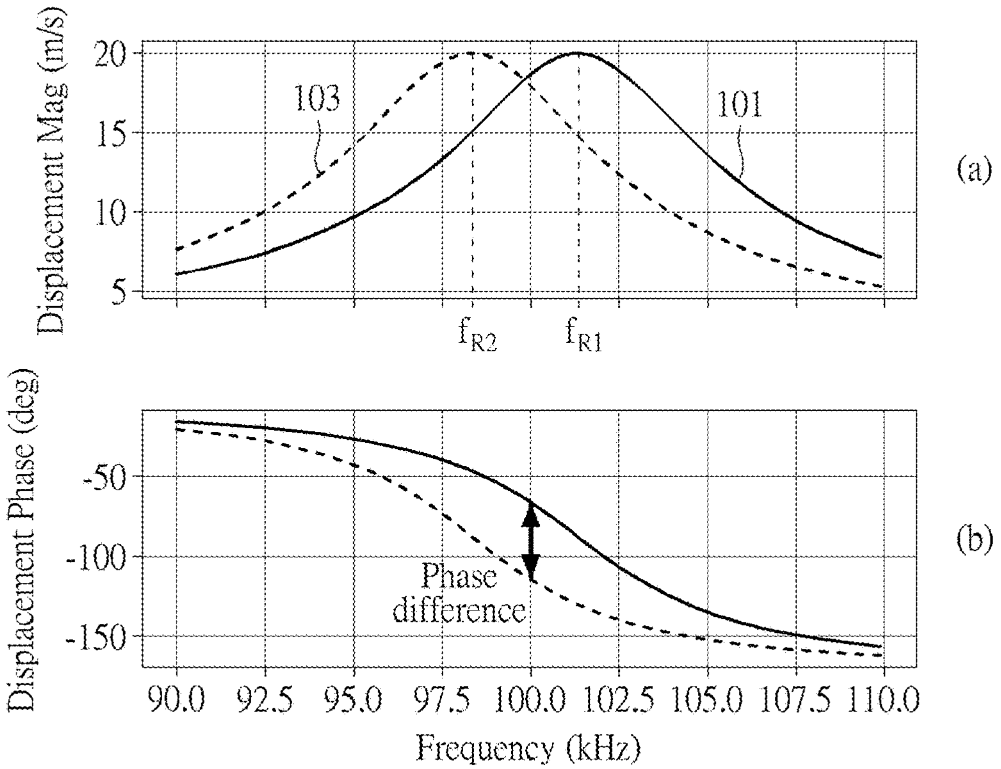
FIG. 4 is a schematic diagram of frequency response of displacements of flaps of the air-pulse generating device shown in FIG. 1.

Alternatively, to achieve the phase difference between the movement of the flaps, the same electrical signal may be used to drive multiple flaps with different phase shifts by leveraging the phase response of the mechanical system. A mechanical mass-spring-damper oscillator is noted to have a steep transition in the phase response near resonance (FIG. 4). If operated near resonance, a phase difference between the response of two oscillators may be realized by intentionally shifting the resonant frequencies accordingly such that they are not identical. Such a device may have asymmetrically designed flaps. An asymmetric pair of flaps with residual stress after fabrication may also result in an initial deflection offset that is valuable for this self-demodulation mechanism.

In other words, the first flap 101 and the second flap 103 may be designed asymmetric. It means the first flap 101 and the second flap 103 are designed to have non-identical resonance (frequency), non-identical (residual) stress, non-identical initial deflection, etc. The first flap 101 and the second flap 103 are not limited to be driven by two separate/distinct signals. The first flap 101 and the second flap 103 may be driven by the same driving signal, and phase difference between movement of the flaps 101 and 103 also be achieved, due to the flap design asymmetricity.

In an embodiment, as can be seen from FIG. 4, the first flap 101 may have a first resonance frequency $f_{R1}$, and the second flap 103 may have a second resonance frequency $f_{R2}$. The first resonance frequency $f_{R1}$ may be different from the second resonance frequency $f_{R2}$.

In addition, mechanical coupling between the flaps (e.g., 101 and 103) may also affect the displacement response, and in such a case, the driving frequency may be appropriately chosen to elicit the desired phase difference. In other words, a mechanical coupling may exist between the first flap 101 and the second flap 103.

Furthermore, phase shifts may also be achieved electrically instead of mechanically, such as using passive circuitry to induce electrical resonances with phase shifts.

Figure 5:
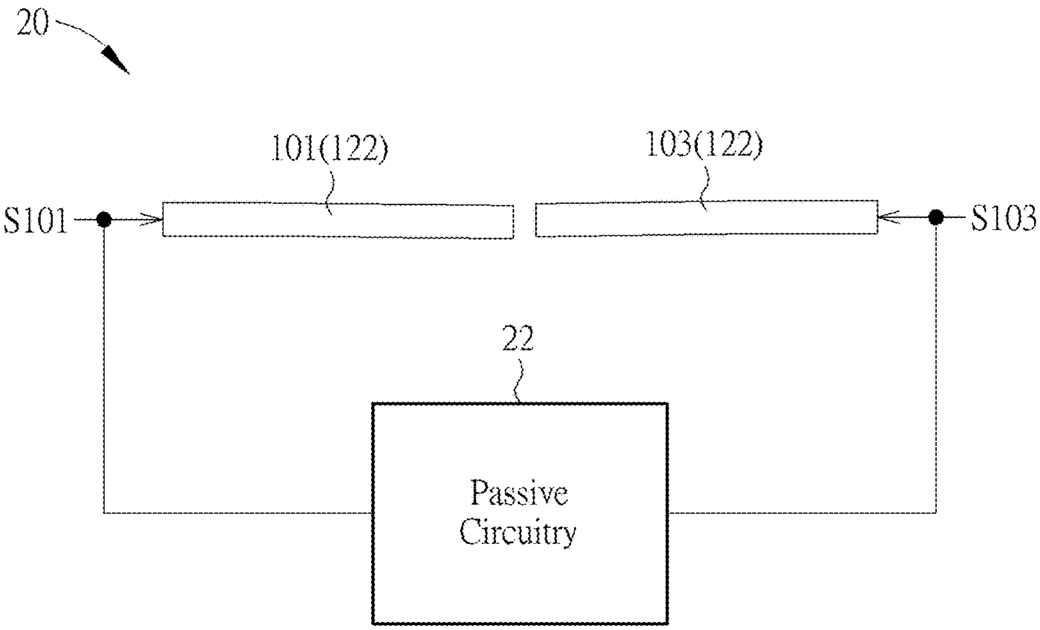
FIG. 5 is a schematic diagram of an air-pulse generating device according to an embodiment of the present invention.

For example, FIG. 5 is a schematic diagram of an air-pulse generating device 20 according to an embodiment of the present invention. The air-pulse generating device 20 is similar to the air-pulse generating device 10. Different from the air-pulse generating device 10, the air-pulse generating device 20 may further comprise a passive circuitry 22, coupled between the first flap 101 and the second flap 103. The passive circuitry 22 may be configured to induce electrical resonances. In an embodiment, the passive circuitry 22 may comprise passive component such as inductor or capacitor.

In the present application, the term "substantial" or "substantially" generally implies that a small/tolerable/negligible deviation may or may not be included. For instance, the term "substantial" or "substantially" implies that a deviation within a certain percentage (e.g., 5%, 1%, or 0.1%) is included.

The technical features described in the embodiments of the present invention may be mixed or combined in various ways as long as there are no conflicts between them.

In summary, via the out-of-phase oscillation of the first and second flaps, the air-pulse generating device is able to perform self-demodulation, which is suitable for air moving applications such as active air cooling, ventilation, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air-pulse generating device, comprising:
a flap pair, comprising a first flap and a second flap opposite to each other;
wherein the first flap and the second flap oscillate at an oscillation frequency and oscillate in an out-of-phase fashion with each other;
wherein during an oscillation of the flap pair, the flap pair forms a virtual valve or an opening at an opening rate corresponding to the oscillation frequency;
wherein the opening rate is the oscillation frequency, such that the virtual valve is opened once per cycle of the oscillation frequency.

2. The air-pulse generating device of claim 1,
wherein the flap pair forms the virtual valve opened when the flap pair moves towards a first direction;
wherein the flap pair forms the virtual valve closed when the flap pair moves towards a second direction opposite to the first direction.

3. The air-pulse generating device of claim 1,
wherein a first movement of the first flap has a phase difference with respect to a second movement of the second flap.

4. The air-pulse generating device of claim 3,
wherein the phase difference is substantially 45° or substantially a multiple of 45°.

5. The air-pulse generating device of claim 1,
wherein the first flap is driven by a first signal, and the second flap is driven by a second signal;
wherein the first signal has a phase shift with respect to the second signal.

6. The air-pulse generating device of claim 5,
wherein a first bias voltage of the first signal is different from a second bias voltage of the second signal.

7. The air-pulse generating device of claim 1,
wherein a first resonance frequency of the first flap is different from a second resonance frequency of the second flap.

8. The air-pulse generating device of claim 1, wherein the flap pair is asymmetric.

9. The air-pulse generating device of claim 1,
wherein the first flap and the second flap are driven by a driving signal.

10. The air-pulse generating device of claim 1, comprising:
a passive circuitry, coupled between the first flap and the second flap.

11. The air-pulse generating device of claim 1,
wherein a common mode velocity of the flap pair toward a first polarity coincide with a first period of the virtual valve being opened;
wherein the common mode velocity of the flap pair toward a second polarity coincide with a second period of the virtual valve being closed.

12. The air-pulse generating device of claim 1,
wherein the air-pulse generating device produces a plurality of unipolar air pulses at an ultrasonic pulse rate.

13. The air-pulse generating device of claim 1,
wherein the air-pulse generating device produces an airflow toward a direction.

14. The air-pulse generating device of claim 1,
wherein the air-pulse generating device is for air moving applications.

15. The air-pulse generating device of claim 1,
wherein at a first time within an oscillation cycle, the first flap and the second flap are actuated to move away from each other to open the virtual valve;
wherein at a second time within the oscillation cycle, the first flap and the second flap are actuated to move toward each other to close the virtual valve.

16. The air-pulse generating device of claim 1,
wherein the first flap and the second flap are actuated via piezoelectric actuation.

17. An airflow generating method, applied on an air-pulse generating device, the airflow generating method comprising:

actuating a first flap and a second flap to oscillate at an oscillation frequency and oscillate in an out-of-phase fashion with each other;

wherein the air-pulse generating device comprises the first flap and the second flap opposite to each other;

wherein during an oscillation of the flap pair, the flap pair forms a virtual valve or an opening at an opening rate corresponding to the oscillation frequency;

wherein the opening rate is the oscillation frequency, such that the virtual valve is opened once per cycle of the oscillation frequency.

18. The airflow generating method of claim 17, wherein the step of actuating the first flap and the second flap to oscillate in the out-of-phase fashion with each other comprises:

actuating the first flap and the second flap, such that a first movement of the first flap constantly has a phase difference with respect to a second movement of the second flap.

19. The airflow generating method of claim 17, actuating the first flap and the second flap, such that at a first time within an oscillation cycle the first flap and the second flap move away from each other, and at a second time within the oscillation cycle the first flap and the second flap move toward each other.

* * * * *